(12) United States Patent
Chandramohan et al.

(10) Patent No.: US 11,343,137 B2
(45) Date of Patent: May 24, 2022

(54) DYNAMIC SELECTION OF ACTIVE ROUTER BASED ON NETWORK CONDITIONS

(71) Applicant: Cisco Technology, Inc., San Jose, CA (US)

(72) Inventors: Gowri Mahendran Lingam Chandramohan, Sunnyvale, CA (US); Managa Sunitha Arun Kumar, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 58 days.

(21) Appl. No.: 16/549,479

(22) Filed: Aug. 23, 2019

(65) Prior Publication Data

US 2021/0058284 A1    Feb. 25, 2021

(51) Int. Cl.
*H04L 41/0668* (2022.01)
*H04L 49/552* (2022.01)

(52) U.S. Cl.
CPC ........ *H04L 41/0668* (2013.01); *H04L 49/552* (2013.01)

(58) Field of Classification Search
None
See application file for complete search history.

(56) References Cited

U.S. PATENT DOCUMENTS

| 7,990,852 | B1 * | 8/2011 | Cirkovic | H04L 45/00 370/228 |
| 10,033,667 | B1 | 7/2018 | Ghosh | |
| 10,560,379 | B1 * | 2/2020 | Ghosh | H04L 43/0888 |
| 2003/0233473 | A1 * | 12/2003 | Bonhomme | H04L 45/00 709/238 |
| 2010/0149980 | A1 * | 6/2010 | Cheung | H04Q 3/0087 370/235 |

(Continued)

FOREIGN PATENT DOCUMENTS

| CN | 102571527 | 7/2012 |
| WO | 2012048585 | 4/2012 |

OTHER PUBLICATIONS

Bhagat, "Virtual Router Redundancy Protocol—A Best Open Standard Protocol in Maintaining Redundancy," Semanit Scholar, 2011, pp. 67-70.

*Primary Examiner* — Saumit Shah
(74) *Attorney, Agent, or Firm* — Polsinelli PC

(57) ABSTRACT

Systems and methods for managing edge routers include monitoring one or more trigger conditions related to transport links between two or more edge routers and one or more external networks. A first parameter associated with a first edge router is modified if at least one trigger condition is detected, the at least one trigger condition related to at least one transport link between the first edge router and the one or more external networks. The first parameter is compared with a second parameter associated with a second edge router of the two or more edge routers. A role of primary edge router is dynamically reassigned to one of the first edge router or the second router based on the comparison of the first parameter and the second parameter, where traffic between a local network and the one or more external networks is routed through the primary edge router.

20 Claims, 8 Drawing Sheets

(56) References Cited

U.S. PATENT DOCUMENTS

| | | | |
|---|---|---|---|
| 2015/0381428 A1* | 12/2015 | Ong | H04L 49/254 |
| | | | 709/223 |
| 2016/0380818 A1* | 12/2016 | Swinkels | H04Q 11/0066 |
| | | | 398/52 |
| 2017/0230231 A1 | 8/2017 | Hsu et al. | |
| 2018/0109493 A1* | 4/2018 | Khan | H04L 63/0272 |

\* cited by examiner

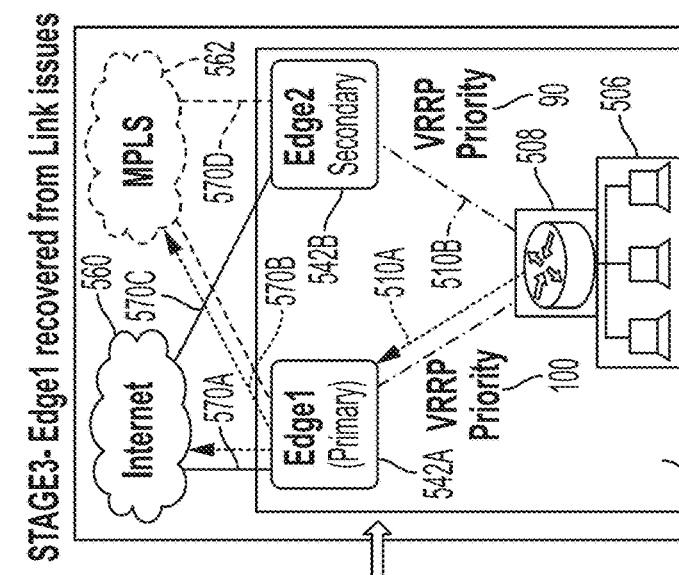
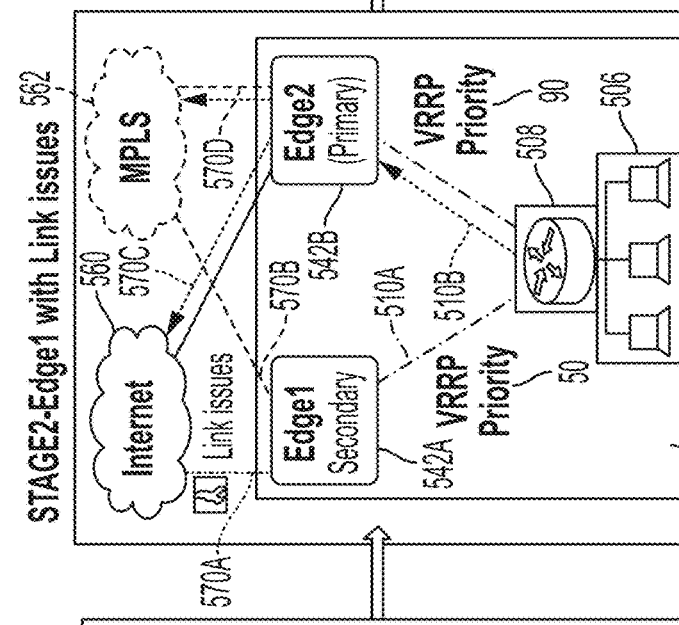
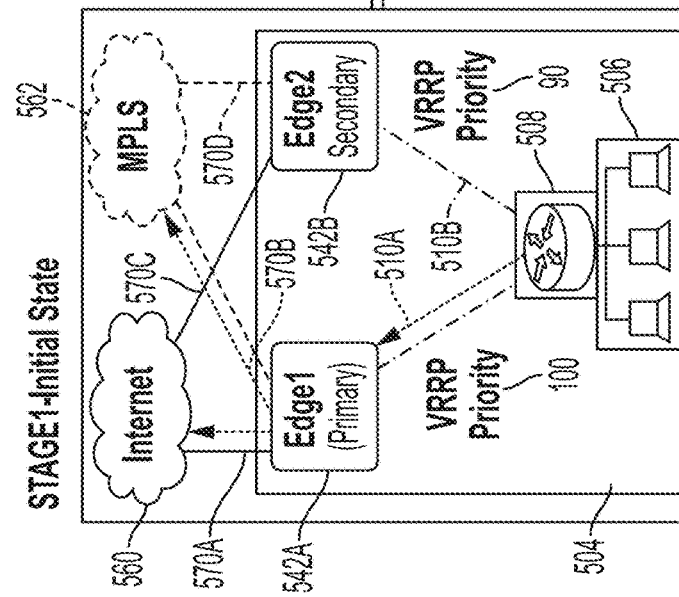

DYNAMIC SELECTION OF ACTIVE ROUTER BASED ON NETWORK CONDITIONS

TECHNICAL FIELD

The subject matter of this disclosure relates in general to the field of computer networking, and more particularly to dynamic selection of routers, such as active edge routers, based on network conditions.

BACKGROUND

The enterprise network landscape is continuously evolving. There is a greater demand for mobile and Internet of Things (IoT) device traffic, Software as a Service (SaaS) applications, and cloud adoption. In recent years, software-defined enterprise network solutions have been developed to address the needs of enterprise networks. Software-defined enterprise networking is part of a broader technology of software-defined networking (SDN) that includes both software-defined wide area networks (SDWAN) and software-defined local area networks (SDLAN). SDN is a centralized approach to network management which can abstract away the underlying network infrastructure from its applications. This de-coupling of data plane forwarding and control plane can allow a network operator to centralize the intelligence of the network and provide for more network automation, operations simplification, and centralized provisioning, monitoring, and troubleshooting. Software-defined enterprise networking can apply these principles of SDN to the WAN and the LAN.

In some examples, LANs can be deployed for providing local networking infrastructure for enterprise networks. For example, customer sites, remote sites, on-premise data centers, can implement LANs for at least partial provision of the respective local networking infrastructure. Some LAN deployments can utilize two or more edge routers (e.g., dual SDWAN edge routers) for handling redundancy and providing backup solutions at the local sites. These edge routers may be configured with protocols such as Border Gateway Protocol (BGP), Open Shortest Path First (OSPF) or Virtual Router Redundancy Protocol (VRRP), for routing data and/or control traffic through the local networks or service LANs.

If LAN packets of the local site are managed in an Equal Cost Multipathing (ECMP) manner through the two edge routers in a dual edge router setup, it is not possible to steer traffic in different networking layers such as layer 4 (L4) to layer 7 (L7) due to traffic-based security concerns. For example, the traffic steering may not be feasible in such setups because symmetric routing may be required to obtain details of the traffic flow at the edge routers. Accordingly, in conventional deployments, one of the two or more edge routers may be treated as a primary router and the other(s) as secondary router(s).

In such deployments with designations of primary and secondary routers, if the primary edge router, (which is receiving traffic from the local site based on designation as the VRRP master or through routing with higher preference) has transport link issues (e.g., WAN transport link connectivity problems for interconnections outside the LAN, such as, Interface-down, BFD-down, OMP-down, Control-connection-down, etc.) the traffic flowing outside the primary edge router will get dropped on the primary edge router even if the secondary edge router may have its transport link active and in working condition. In such conventional deployments, the traffic may be steered to the secondary edge router only if primary edge router has failed or is down, but not in the above-described situations where the primary router may experience transport link issues.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIGS. 5A-C illustrate aspects of reassigning a primary edge router role based on transport link conditions in a network, in accordance with some examples;

DETAILED DESCRIPTION

Figure 1:
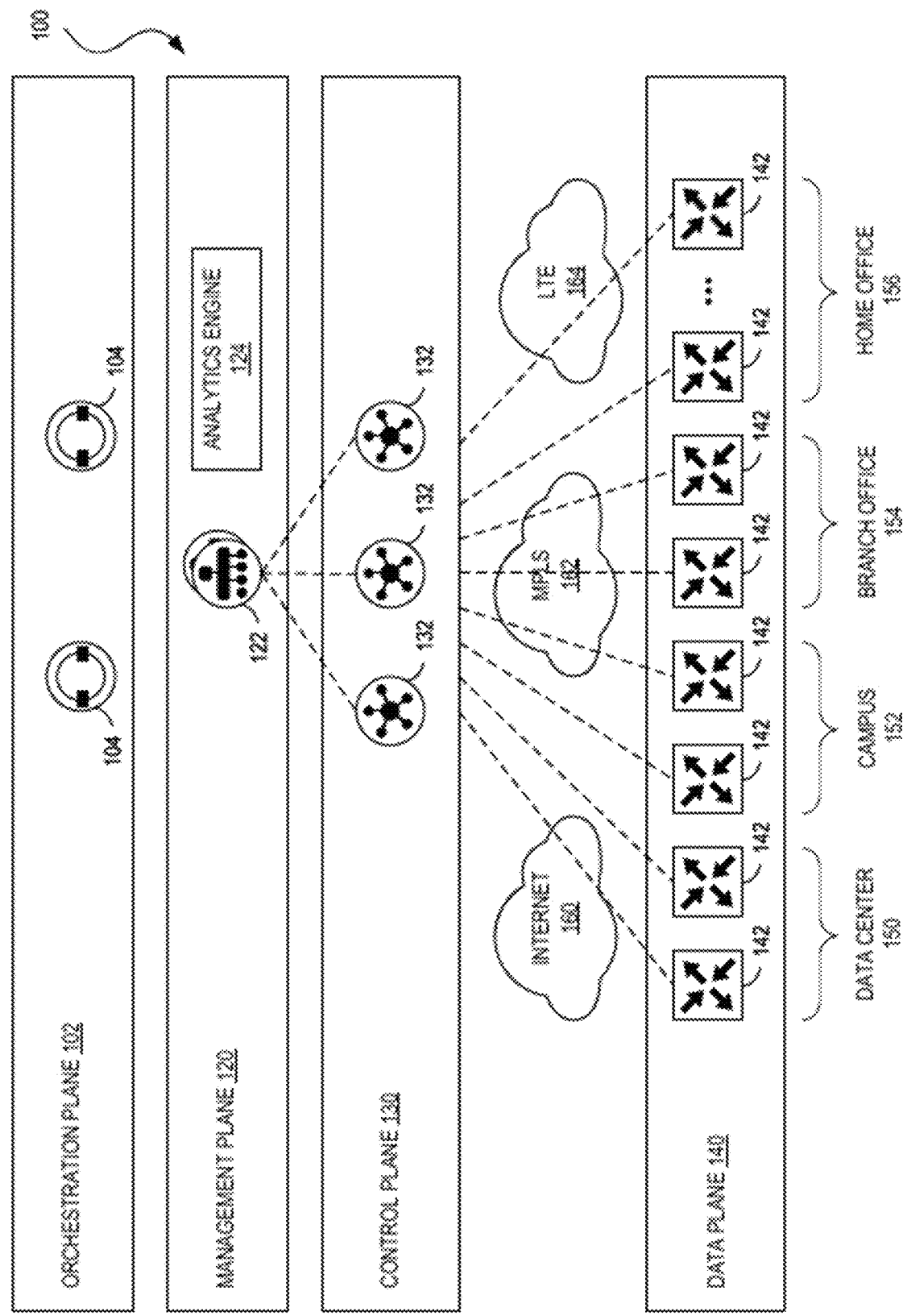
FIG. 1 illustrates a high-level network architecture, in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and computer-readable media for efficient handling of transport links between local networks and one or more external networks. For example, in some aspects, one or more edge routers providing connectivity between a local network one or more external networks through one or more transport links are disclosed, where the one or more edge routers are configured to handle failure scenarios in the one or more transport links.

In some examples, if a first edge router designated as a primary edge router experiences connectivity issues to the one or more transport links, one or more secondary edge routers can be promoted to the primary edge router role. Various trigger conditions related to the one or more transport links between the one or more edge routers are disclosed, where the trigger conditions can be used for dynamically modifying designations of the primary edge router among the one or more edge routers. In some examples, one or more parameters can be used for dynamically a role of the primary edge router to a first edge router of the one or more edge routers. For example, the one or more parameters may be employed for demoting the first edge router from the primary edge router role and promoting a second edge router to the primary edge router role upon detecting a trigger condition, even if the first edge router has not completely failed. Accordingly, in contrast to the conventional techniques described above, the dynamic reassignments of the primary edge router role can minimize packet losses if connectivity issues develop in the one or more transport links.

In some examples, the one or more parameters for designating the one or more edge routers as a primary edge router include policy settings such as priority settings in VRRP protocols. In some examples, the policy settings can include preferences, weights, and/or as-path settings in BGP/OSPF configurations. In some examples, the one or more trigger conditions pertaining to the one or more transport links can include a status of control connections between the two or more edge routers and controllers of two or more edge routers for a configurable time duration. In some examples, the one or more trigger conditions can include a status of Overlay Management Protocol (OMP) connections to the controllers for a configurable time duration. Other examples of the one or more trigger conditions can include a status of a configurable number of Bidirectional Forwarding Detections (BFDs) for the two or more edge routers, or a status of a configurable number of transport links.

In some examples, a method is provided. The method can include monitoring one or more trigger conditions related to transport links between two or more edge routers and one or more external networks. The method can include modifying a first parameter associated with a first edge router of the two or more edge routers if at least one trigger condition of the one or more trigger conditions is detected, the at least one trigger condition related to at least one transport link between the first edge router and the one or more external networks. The method can further include comparing the first parameter with a second parameter associated with a second edge router of the two or more edge routers, and dynamically assigning a role of primary edge router to one of the first edge router or the second router based on comparing the first parameter with the second parameter, wherein traffic between a local network and the one or more external networks is routed through the primary edge router.

In some examples, a system is provided, the system comprising one or more processors, and a non-transitory computer-readable storage medium containing instructions. The instructions, when executed on the one or more processors, cause the one or more processors to perform operations including: monitoring one or more trigger conditions related to transport links between two or more edge routers and one or more external networks; modifying a first parameter associated with a first edge router of the two or more edge routers if at least one trigger condition of the one or more trigger conditions is detected, the at least one trigger condition related to at least one transport link between the first edge router and the one or more external networks; comparing the first parameter with a second parameter associated with a second edge router of the two or more edge routers; and dynamically assigning a role of primary edge router to one of the first edge router or the second router based on comparing the first parameter with the second parameter, wherein traffic between a local network and the one or more external networks is routed through the primary edge router.

In some examples, a non-transitory machine-readable storage medium is provided, including instructions configured to cause a data processing apparatus to perform operations including: monitoring one or more trigger conditions related to transport links between two or more edge routers and one or more external networks; modifying a first parameter associated with a first edge router of the two or more edge routers if at least one trigger condition of the one or more trigger conditions is detected, the at least one trigger condition related to at least one transport link between the first edge router and the one or more external networks; comparing the first parameter with a second parameter associated with a second edge router of the two or more edge routers; and dynamically assigning a role of primary edge router to one of the first edge router or the second router based on comparing the first parameter with the second parameter, wherein traffic between a local network and the one or more external networks is routed through the primary edge router.

In some examples, the first edge router and the second edge router are configured according to a Virtual Router Redundancy Protocol (VRRP), wherein the first parameter comprises a first VRRP priority and the second parameter comprises a second VRRP priority. In some examples, modifying the first parameter comprises reducing the first VRRP priority to be lower than the second VRRP priority.

In some examples, the first edge router and the second edge router are configured according to a Border Gateway Protocol (BGP)/Open Shortest Path First (OSPF) protocol, wherein the first parameter comprises a first preference and the second parameter comprises a second preference. In some examples, modifying the first parameter comprises reducing the first preference to be lower than the second preference.

In some examples, the one or more trigger conditions comprise a status of control connections between the two or more edge routers and respective controllers of the two or more routers for a configurable time duration.

In some examples, the one or more trigger conditions comprise a status of Overlay Management Protocol (OMP) connections to controllers of the two or more edge routers for a configurable time duration.

In some examples, the one or more trigger conditions comprise a status of configurable number of Bidirectional Forwarding Detections (BFDs) for the two or more edge routers.

In some examples, the one or more trigger conditions comprise a status of a configurable number of transport interfaces between the two or more edge routers and the one or more external networks.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

Description of Example Embodiments

FIG. 1 illustrates an example of a network architecture 100 for implementing aspects of the present technology. An example of an implementation of the network architecture 100 is the Cisco® Software Defined Wide Area Network (SD-WAN) architecture. In some examples, the network architecture 100 can correspond to an enterprise network. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other examples may include different numbers and/or types of elements but one of ordinary skill the art will appreciate that such variations do not depart from the scope of the present disclosure.

In the illustrated example, the network architecture 100 includes an orchestration plane 102, a management plane 120, a control plane 130, and a data plane 140. The orchestration plane 102 can assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some aspects, the network orchestrator appliance(s) 104 can also enable communication of devices located behind Network Address Translation (NAT). In some aspects, physical or virtual Cisco® SD-WAN vBond appliances can operate as the network orchestrator appliance(s) 104.

The management plane 120 can be responsible for central configuration and monitoring of the network architecture 100. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and one or more transport links between the edge network devices 142 and external networks (e.g., Internet 160, Multiprotocol Label Switching (MPLS) network 162, 4G/LTE network 164, etc.) in an underlay and overlay network. The network management appliance(s) 122 can support multitenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some examples, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some examples, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. In some examples, one or more of the edge network devices 142 can include edge routers configured for dynamic designation of primary and secondary edge router roles according to aspects described herein. The edge network devices 142 can operate at the edges various network environments of local networks such as an organization, e.g., in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more transport links. In some examples, the one or more transport links can include WAN transports to connect to external networks, such as the Internet 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
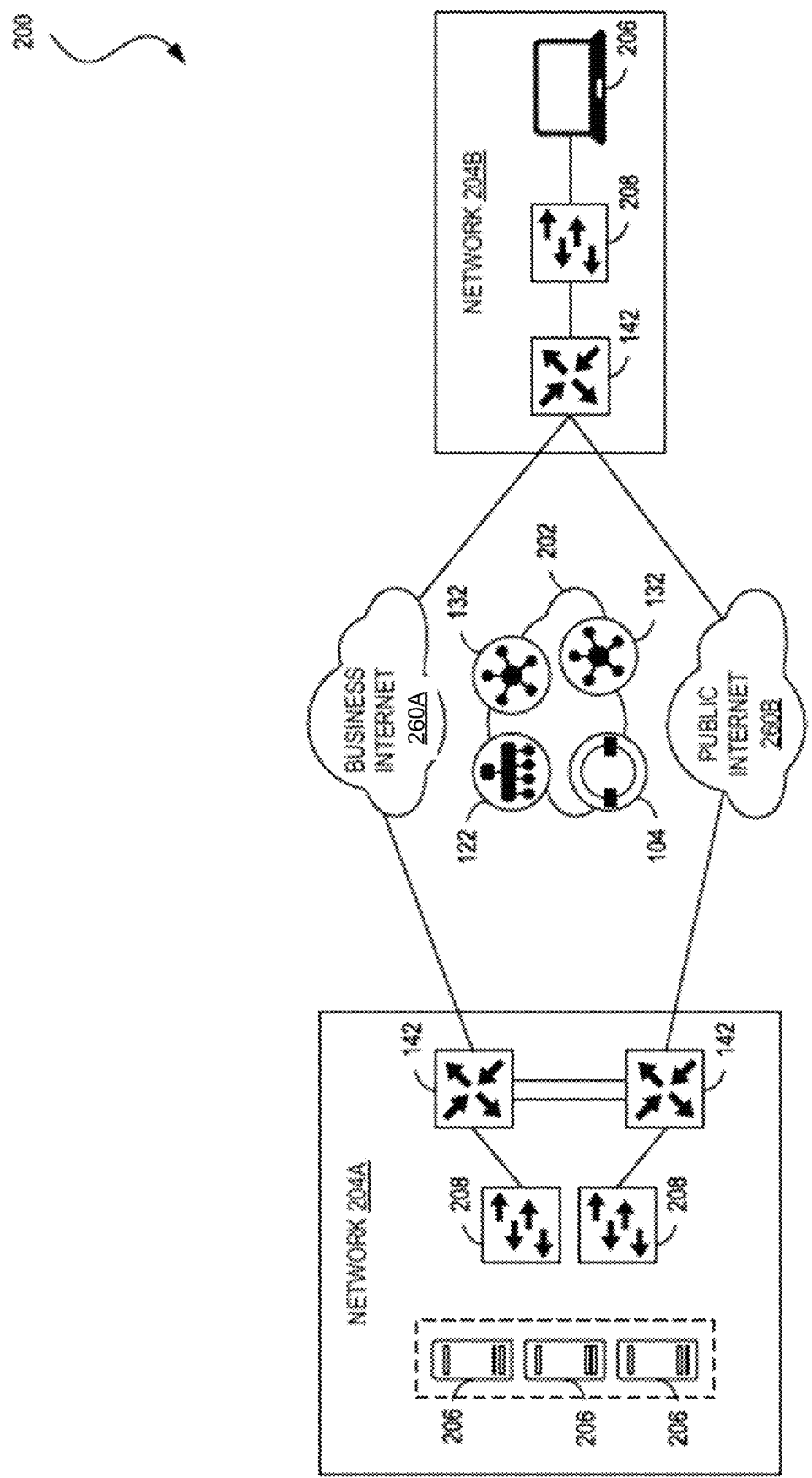
FIG. 2 illustrates a network topology in accordance with some examples.

FIG. 2 illustrates an example of a network topology 200 for showing various aspects of the network architecture 100. The network topology 200 can include a management network 202, a pair of network sites 204A and 204B (collectively, 204) (e.g., local networks such as the data center(s) 150, the campus network(s) 152, the branch office network(s) 154, the home office network(s) 156, cloud service provider network(s), etc.), and a pair of transport links such as Internet transport networks 260A and 260B (collectively, 260). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204. In this example, each element of the management network 202 can be reached through either one of the transport links, transport network 260A or 260B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can include any number of network devices in any network topology, including multi-tier (e.g., core, distribution, and access tiers), spine-and-leaf, mesh, tree, bus, hub and spoke, and so forth. For example, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the external networks such as the Internet 160.

In some examples, "color" can be used to identify an individual transport network, and different transport networks may be assigned different colors (e.g., mpls, private1, biz-internet, metro-ethernet, lte, etc.). For example, the network topology 200 can utilize a color called "biz-internet" for the Business Internet 260A and a color called "public-internet" for the Public Internet 260B.

In some examples, each edge network device 208 can form a Datagram Transport Layer Security (DTLS) or TLS control connection to the network controller appliance(s) 132 and connect to any network control appliance 132 over each transport network 260. In some examples, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
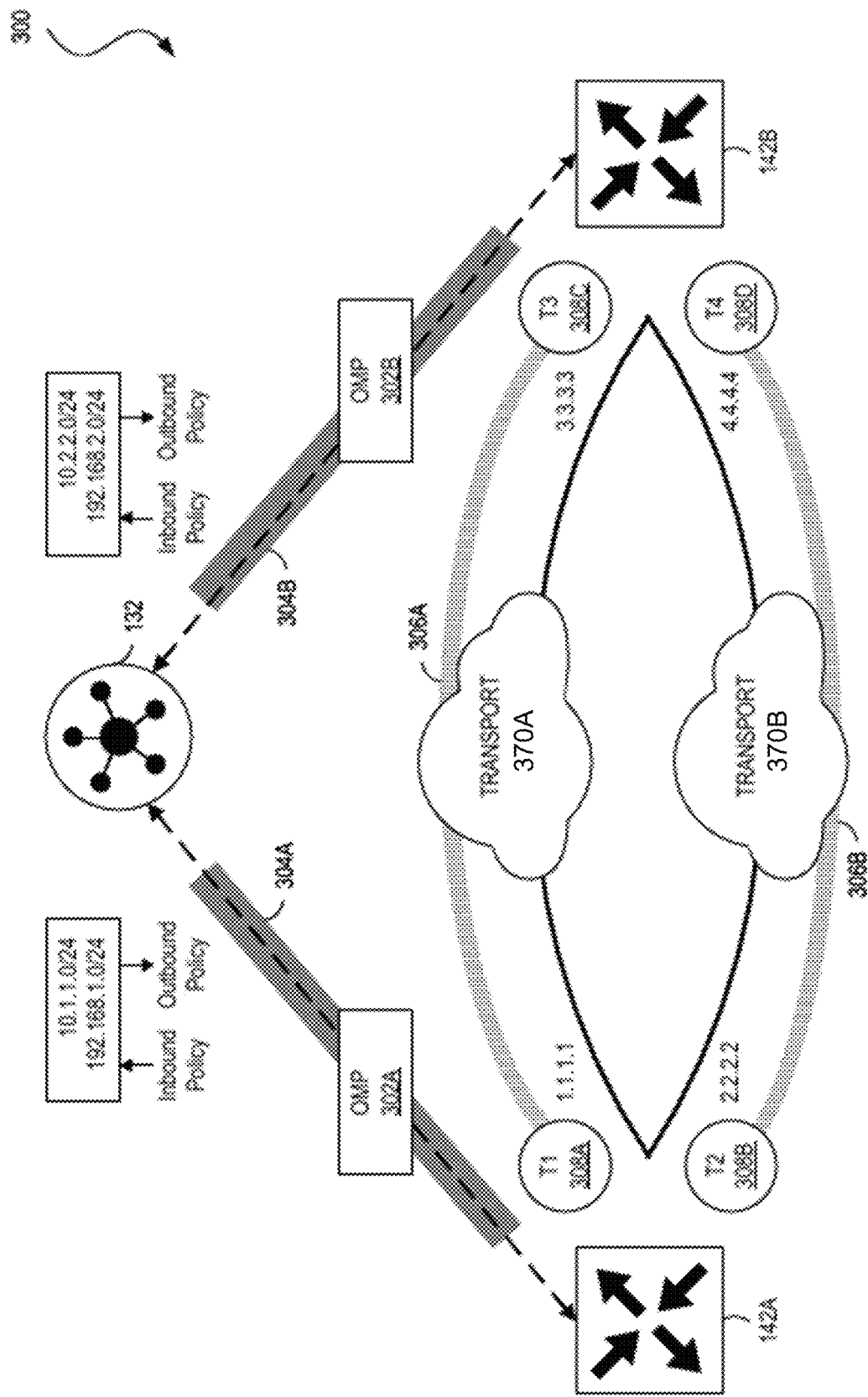
FIG. 3 illustrates an operation of a protocol for managing an overlay network, in accordance with some examples.

FIG. 3 illustrates an example of operation 300 of an overlay management protocol (OMP), which may be used in some examples to manage an overlay of a network (e.g., the network architecture 100). In this example, OMP messages 302A and 302B (collectively, 302) may be transmitted back and forth between the network controller appliance 132 and the edge network devices 142A and 142B, respectively, where control plane information, such as route prefixes, next-hop routes, crypto keys, policy information, and so forth, can be exchanged over respective secure DTLS or TLS connections 304A and 304B. In some examples, one or more trigger conditions used in the designation of the edge network devices 142 as primary or secondary can be based on the OMP messages 302. The network controller appliance 132 can operate similarly to a route reflector. For example, the network controller appliance 132 can receive routes from the edge network devices 142, process and apply any policies to them, and advertise routes to other edge network devices 142 in the overlay. If there is no policy defined, the edge network devices 142 may behave in a manner similar to a full mesh topology, where each edge network device 142 can connect directly to another edge network device 142 at another site and receive full routing information from each site.

The OMP can advertise different OMP routes. In an example, an OMP route can correspond to prefixes that are learned from the local site, or service side, of the edge network device 142. The prefixes can be originated as static or connected routes, or from within, for example, the OSPF or BGP protocols, and redistributed into OMP so they can be carried across the overlay. OMP routes can advertise attributes such as transport location (TLOC) information (which can similar to a BGP next-hop IP address) and other attributes such as origin, originator, preference, site identifier, tag, and virtual private network (VPN). An OMP route may be installed in the forwarding table if the TLOC to which it points is active.

In another example, OMP routes can include TLOC routes, which can correspond to logical tunnel termination points on the edge network devices 142 that connect to one or more external networks through one or more transport links 360A and 360B (collectively referred to as the transport links 360). In some embodiments, a TLOC route can be uniquely identified and represented by a three-tuple, including an IP address, link color, and encapsulation (e.g., Generic Routing Encapsulation (GRE), IPSec, etc.). In addition to system IP address, color, and encapsulation, TLOC routes can also carry attributes such as TLOC private and public IP addresses, carrier, preference, site identifier, tag, and weight. In some embodiments, a TLOC may be in an active state on a particular edge network device 142 when an active BFD session is associated with that TLOC.

In another example, OMP routes can include Service routes, which can represent services (e.g., firewall, distributed denial of service (DDoS) mitigator, load balancer, intrusion prevent system (IPS), intrusion detection systems (IDS), WAN optimizer, etc.) that may be connected to the local sites of the edge network devices 142 and accessible to other sites for use with service insertion. In addition, these routes can also include VPNs; the VPN labels can be sent in an update type to tell the network controller appliance 132 what VPNs are serviced at a remote site.

In the example of FIG. 3, OMP is shown running over the DTLS/TLS tunnels 304 established between the edge network devices 142 and the network controller appliance 132. In addition, the diagram 300 shows an IPSec tunnel 306A established between TLOC 308A and 308C over the WAN transport link 370A and an IPSec tunnel 306B established between TLOC 308B and TLOC 308D over the WAN transport link 370B. Once the IPSec tunnels 306A and 306B are established, BFD can be enabled across each of them.

Figure 4:
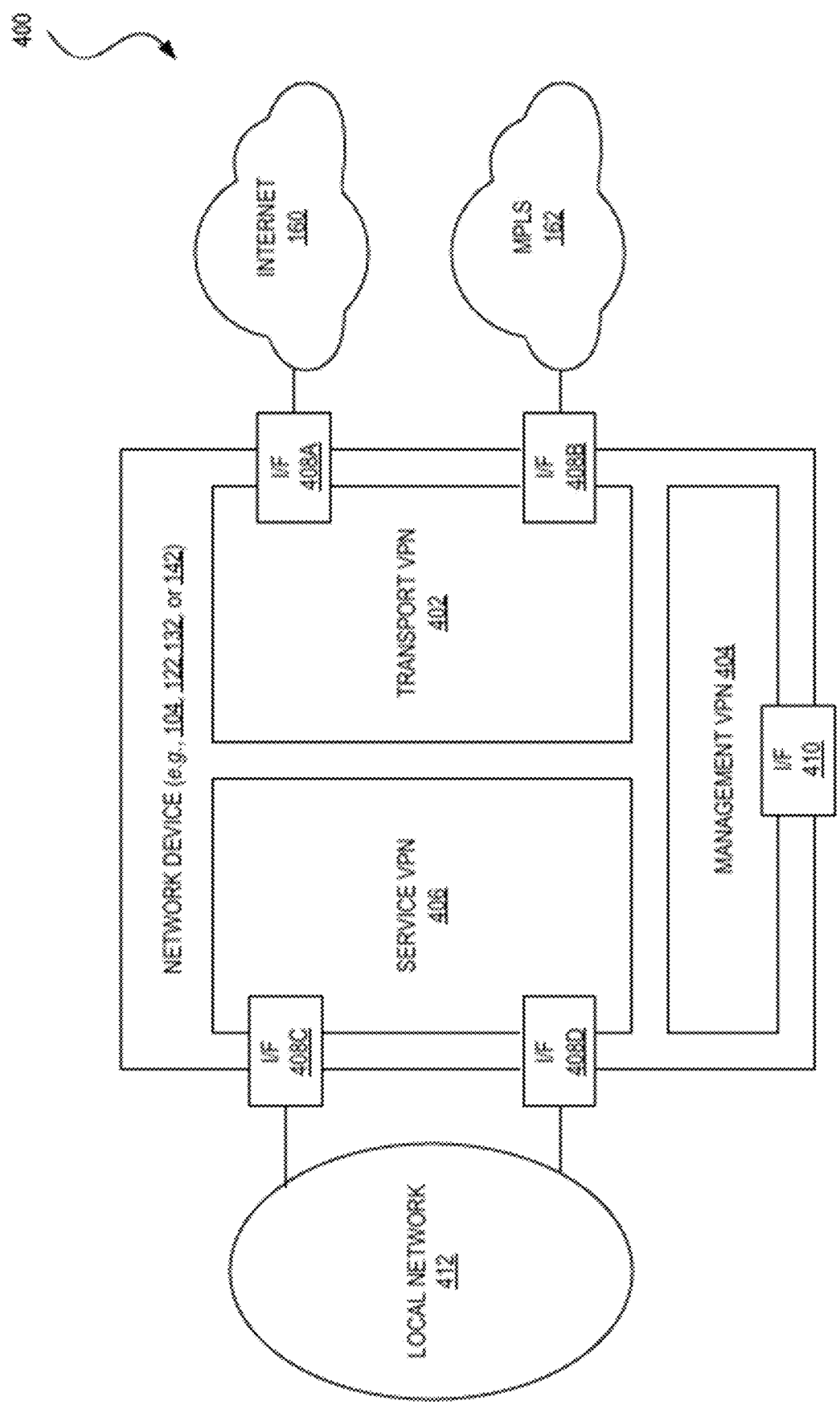
FIG. 4 illustrates an operation of virtual private networks for segmenting a network, in accordance with some examples.

FIG. 4 illustrates an example of operation 400 of two or more VPNs. In some examples, the operation 400 can provide segmentation for a network (e.g., the network architecture 100). In some examples, two or more VPNs can be isolated from one another and can have their own forwarding or routing tables. An interface or sub-interface can be explicitly configured under a single VPN and may not be part of more than one VPN. Labels may be used in OMP route attributes and in the packet encapsulation, which can identify the VPN to which a packet belongs. The VPN number can be a four-byte integer with a value from 0 to 65530. In some examples, the network orchestrator appliance(s) 104, network management appliance(s) 122, network controller appliance(s) 132, and/or edge network device(s) 142 can each include a transport VPN 402 (e.g., VPN number 0) and a management VPN 404 (e.g., VPN number 512). The transport VPN 402 can include one or more physical or virtual network interfaces (e.g., network interfaces 408A and 408B) that respectively connect to the transport links such as WAN transport networks (e.g., for connecting to external networks such as the MPLS network 162 and the Internet 160). Secure DTLS/TLS connections to the network controller appliance(s) 132 or between the network controller appliance(s) 132 and the network orchestrator appliance(s) 104 can be initiated from the transport VPN 402. In addition, static or default routes or a dynamic routing protocol can be configured inside the transport VPN 402 to get appropriate next-hop information so that the control plane 130 may be established and IPSec tunnels 306 (not shown) can connect to remote sites.

The management VPN 404 can carry out-of-band management traffic to and from the network orchestrator appliance(s) 104, network management appliance(s) 122, network controller appliance(s) 132, and/or edge network device(s) 142 over a network interface 410. In some embodiments, the management VPN 404 may not be carried across the overlay network.

In addition to the transport VPN 402 and the management VPN 404, the network orchestrator appliance(s) 104, network management appliance(s) 122, network controller appliance(s) 132, or edge network device(s) 142 can also include one or more service-side VPNs 406. The service-side VPN 406 can include one or more physical or virtual network interfaces (e.g., network interfaces 408C and 408D) that connect to one or more local networks 412 and carry user data traffic. The service-side VPN(s) 406 can be enabled for features such as OSPF or BGP, Virtual Router Redundancy Protocol (VRRP), QoS, traffic shaping, policing, and so forth. In some embodiments, user traffic can be directed over IPSec tunnels to other sites by redistributing OMP routes received from the network controller appliance(s) 132 at the site 412 into the service-side VPN routing protocol. In turn, routes from the local site 412 can be advertised to other sites by advertising the service VPN routes into the OMP routing protocol, which can be sent to the network controller appliance(s) 132 and redistributed to other edge network devices 142 in the network. Although the network interfaces 408A-D and 410 are shown to be physical interfaces in this example, one of ordinary skill in the art will appreciate that the interfaces 408A-D and 410 in the transport and service VPNs can also be sub-interfaces instead.

FIGS. 5A-B illustrate aspects of an example network 500 according to this disclosure. The network 500 may be configured according to the network architecture 100. In an illustrative example, the network 500 can include a local network 504 and one or more external networks such as Internet 560 and MPLS network 562, among others. The local network 504 can be configured according to the network sites 204A-B described with reference to the network topology 200 of FIG. 2 in some examples. For example, the local network 504 can include one or more of the data center(s) 150, the campus network(s) 152, the branch office network(s) 154, the home office network(s) 156, cloud service provider network(s), etc., as shown and described with reference to FIG. 1, for example.

In further detail, the local network 504 can include various network elements such as one or more endpoints 506, site network devices 508, etc., which may be similar to the endpoints 206 and site network devices 208 discussed with reference to FIG. 2. For example, the endpoints 506 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), Internet of Things (IoT) devices or equipment, among others; and the site network devices 508 can include physical or virtual switches, routers, and other network devices.

In some examples, the site network devices 508 can connect the endpoints 506 to one or more edge network devices 542A and 542B (collectively, the edge network devices 542). In some examples, two or more edge network devices 542 may be provided for connecting the local network 504 to the external networks in order to satisfy redundancy criteria. For example, the edge network devices 542 can connect the local network (including the endpoints 506, the site network devices 508, etc.) to one or more transport links 570A-D (collectively, transport links 570). The transport links 570 can include transport links such as WAN transport links (e.g., the transport networks 260A and 260B of FIG. 2, the WAN transport links 370A-B of FIG. 3, etc.), to connect the edge network devices 542 to the external networks such as the Internet 560, the MPLS network 562, etc. In some examples, the transport links 570 can also include cross connect links (e.g., a transport location (TLOC) extension). In some examples, the local network 504 can implement BGP/OSPF routing or VRRP configurations for the edge network devices 542.

In some examples, the edge network devices 542 can include switches, routers, customer-provided equipment (CPE) edge routers, etc., for establishing connections between the local network 504 and the one or more transport links 570 which may be dedicated to respective edge network devices 542. In some examples, the edge network device 542A can include a first edge router and the edge network device 542B can include a second edge router. In the example shown in FIG. 5A, the edge network device 542A can be designated as a primary edge router. In some examples, a network controller device (e.g., a network controller appliance 132 such as a vSmart controller, as described with reference to FIG. 1) can assign the primary edge router role to the edge network device 542A.

In some examples, one or more parameters can be used for designating one of the edge network devices 542 as the primary edge router. In some examples, the one or more parameters can include policy settings such as priority settings in VRRP protocols. In FIGS. 5A-C, priority settings using the VRRP protocols are used to illustrate examples of the one or more parameters which can be used for designating one of the edge network devices 542 as the primary edge router. For example, a network controller appliance 132 such as a vSmart controller can assign the primary edge router role to the edge network device 542A based on configuring a higher VRRP priority to be associated with the edge network device 542A in comparison to the VRRP priorities associated with other edge network devices 542 such as the edge network device 542B.

In the illustrative example shown in FIG. 5A, the edge network device 542A (e.g., comprising a first edge router Edge 1) is shown be assigned a first VRRP priority of "100" and the edge network device 542B (e.g., comprising a second edge router Edge 2) is shown be assigned a second VRRP priority of "90". Since the first VRRP priority is greater than the second VRRP priority, the edge network device 542A is assigned the role of the primary edge router in FIG. 5A. This is considered to be an initial state for the purpose of this discussion.

As seen in FIG. 5A, the edge network device 542A can include the transport link 570A to connect to the Internet 560 and the transport link 570B to connect to the MPLS network 562. Similarly, the edge network device 542B can include the transport link 570C to connect to the Internet 560 and the transport link 570D to connect to the MPLS network 562. Since the edge network device 542A is the primary edge router in FIG. 5A, the local network communicates with one or more external networks such as the Internet 560 and the MPLS network 562 through the primary edge router using the WAN transport links 570A and 570B, respectively. One or more secondary edge routers such as the edge network device 542B are not used while the primary edge router role is assigned to the edge network device 542A. For example, such secondary edge routers are provided as backups or for redundancy in case there is any problem with the edge network device 542A or one or more of the WAN transport links 570A and 570B.

According to example aspects, if there is a failure condition in the edge network device 542A or one or more of the WAN transport links 570A and 570B, traffic loss (e.g., due to packet/traffic drop) from the local network 204 routed through the edge network device 542A will be minimized. In some examples, one of the other the edge network devices 542 such as the edge network device 542B can be dynamically reassigned the role of the primary edge router in such situations. For example, by reassigning the role of the primary edge router to the edge network device 542B, the edge network device 542B can route traffic through the transport link 570C to connect to the Internet 560 and/or the transport link 570D to connect to the MPLS network 562. In some examples, reassigning the role of the primary edge router from the edge network device 542A to the edge network device 542B can include reducing the first VRRP priority of the edge network device 542A and/or increasing the second VRRP priority of the edge network device 542B. In some examples, dynamically reassigning the role of the primary edge router in this manner can be performed upon detecting one or more trigger conditions which may be indicative of failures or problems in one or more of the edge network devices 542 or the transport links 570.

For example, as shown in FIG. 5B, the transport link 570A which connects the edge network device 542A to the Internet 560 can develop link issues which may cause traffic or packets on the transport link 570A to be dropped. In conventional implementations discussed previously, detecting such link issues would be difficult and/or delayed due to lack of related mechanisms for doing so quickly and efficiently. In example aspects, one or more trigger conditions may be used for quickly and efficiently detecting such link issues.

In one example, link issues in the transport links 570 can be detected based upon one or more trigger conditions related to a status of control connections between the edge network devices 542 and their respective controllers for a pre-specified duration of time. For example, connections between devices of the control plane 130 (FIG. 1) such as network controller appliances 132 (e.g., vSmarts) and the edge network devices 542 can be monitored and if there is any connection problem which persists for a specified and/or configurable duration of time, one or more trigger conditions may be effected. For example, if control connections between the edge network device 542A to respective network control appliances (e.g., vSmarts) are down, disabled, inactive, etc., for a configurable time duration (e.g., 30 minutes), one type of trigger may be raised. Such trigger conditions can be indicative of respective transport links, such as the transport link 570A.

In another example, link issues in the transport links 570 can be detected based upon one or more trigger conditions related to a status of Overlay Management Protocol (OMP) connections between the edge network devices 542 and their respective controllers for a pre-specified duration of time. For example, OMP connections between devices of the control plane 130 such as network controller appliances 132 (e.g., vSmarts) and the edge network devices 542 can be monitored and if there is any connection problem which persists for a specified and/or configurable duration of time, one or more trigger conditions may be effected. For example, if OMP connections between the edge network device 542A to respective network control appliances (e.g., vSmarts) are down, disabled, inactive, etc., for a configurable time duration (e.g., 30 minutes), another type of trigger may be raised. Such trigger conditions can also be indicative of respective transport links, such as the transport link 570A.

In yet another example, link issues in the transport links 570 can be detected based upon one or more trigger conditions related to Bidirectional Forwarding Detection (BFD)

links between the edge network devices 542 and their respective controllers for a pre-specified duration of time. For example, BFD links between devices of the control plane 130 such as network controller appliances 132 (e.g., vSmarts) and the edge network devices 542 can be monitored and if a configurable number of BFDs are down, disabled, or inactive, one or more trigger conditions may be effected. For example, if 50 BFD links between the edge network device 542A to respective network control appliances (e.g., vSmarts) are down, disabled, inactive, etc., yet another type of trigger may be raised. Such trigger conditions can also be indicative of respective transport links, such as the transport link 570A.

In yet another example, one or more trigger conditions can be related to a configurable number of transport interfaces of the edge network devices 542 to the transport links 570 being down, disabled, or inactive. For example, if one or more interfaces (e.g., interfaces 408A-B of FIG. 4) of the edge network device 542A to respective transport links 570A-B are down, disabled, or inactive, yet another type of trigger may be raised. Such trigger conditions can also be indicative of respective transport links, such as the transport link 570A.

In FIG. 5B, the link issues in the transport link 570A can be detected based on one or more of the above trigger conditions being detected (e.g., at a network control appliance 132 which controls the edge network device 542A). Upon detection of the one or more trigger conditions, the network control appliance 132 (or other device) can determine that the primary edge router role is to be reassigned from the edge network device 542A to the edge network device 542B. According to an illustrative example, reassigning the primary edge router role can include reducing the first VRRP priority of the edge network device 542A (e.g., from "100" to "50") in a way which would bring the first VRRP priority to be lower than the second VRRP priority of the edge network device 542B (which would still be "90" in this example). Upon being designated as the primary edge router in this manner, the edge network device 542B can then assume the role of routing packets between the local network 504 and the one or more external networks such as the Internet 560 and the MPLS network 562 through the transport links 570C and 570D, which may still be active and not have any link issues (alternatively, any other edge network device, not shown, whose transport links are active can be assigned the role of the primary edge router in similar fashion)

In FIG. 5C, an example is illustrated where the transport link issues of the transport link 570A have been resolved. In some examples, an indication of the transport link issues being resolved can be provided to the respective network controller appliance 132, for example, by resetting or clearing or withdrawing the one or more trigger conditions which were previously set to indicate the transport link issues, as discussed with reference to FIG. 5B. For example, one or more trigger conditions may be withdrawn when the respective one or more situations noted above (e.g., with respect to control connections, OMP connections, BFD links, transport interfaces, etc., among others) have been resolved. In some examples, if the transport link issues affecting the edge network device 542A, which was originally designated as the primary edge router, have been resolved, then the primary edge router role can be assigned back to the edge network device 542A. In some examples, this can be accomplished by increasing the first VRRP priority of the edge network device 542A to exceed the second VRRP priority of the edge network device 542B (e.g., by increasing the first VRRP priority from "50" back to "100", which would cause it to be greater than the second VRRP priority of "90"). Subsequently, the edge network device 542A will resume the role of the primary edge router and route packets between the local network 504 and the one or more external networks such as the Internet 560 and the MPLS network 562 through the transport links 570A and 570B. In this manner, using one or more parameters such as the VRRP priority, the primary edge router role can be dynamically reassigned amongst the edge network devices 542 if transport link issues in the transport links 570 are detected based on the one or more trigger conditions.

As will be understood, various other parameters other than the VRRP priorities can also be used for the dynamic reassignment of the primary edge router role. For example, although not discussed in exhaustive detail, other parameters which can also be used for designating one of the edge network devices 542 as the primary edge router can include other policy settings such as preferences, weights, and/or as-path settings in BGP/OSPF configurations of the local networks or service LAN networks. For example, preferences/weights can be dynamically modified for the one or more edge network devices of a local network, such that based on respective values of the preferences/weights, primary edge router roles can be designated. For example, the edge network devices 542A and 542B can be configured according to a BGP/OSPF protocol, wherein a first parameter of the edge network device 542A can include a first preference and a second parameter of the edge network device 542B can comprise a second preference. Modifying the first parameter to reassign the role of the primary edge router from the edge network device 542A to the edge network device 542B can include reducing the first preference to be lower than the second preference Similar techniques can be implemented for other policies/parameters related to the edge routers discussed herein.

Figure 6:
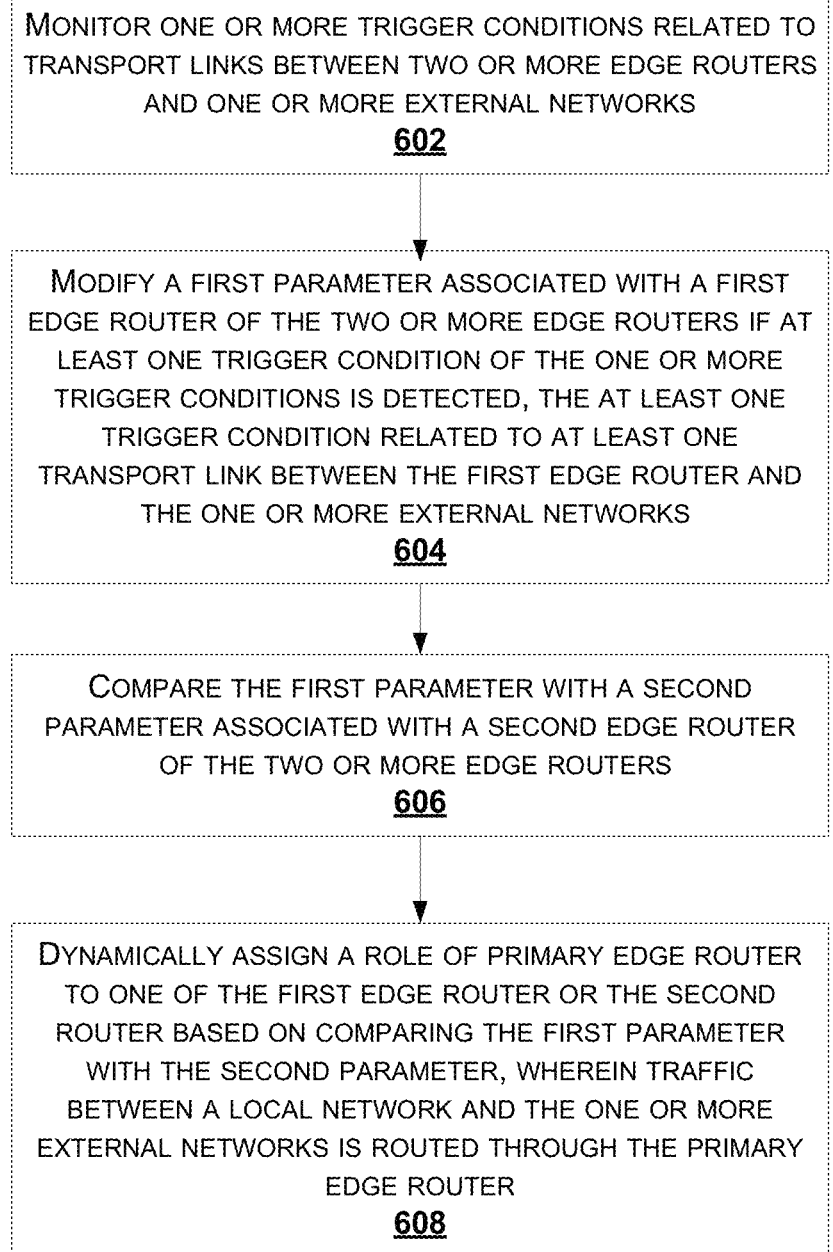
FIG. 6 illustrates a process for assigning an active edge router, in accordance with some examples.

Having described example systems and concepts, the disclosure now turns to the process 600 for selecting/assigning an active edge router, as illustrated in FIG. 6. The blocks outlined herein are examples and can be implemented in any combination thereof, including combinations that exclude, add, or modify certain steps.

At the block 602, the process 600 includes monitoring one or more trigger conditions related to transport links between two or more edge routers and one or more external networks. For example, as discussed with reference to FIGS. 5A-C, one or more control devices (e.g., network controller appliances 132 such as vSmarts) can monitor the one or more trigger conditions related to control connections, OMP connections, BFD links, transport interfaces, etc., of the one or more transport links 570A-D between the two or more edge network devices 542A-B and the one or more external networks such as the Internet 560 and the MPLS network 562.

At block 604, the process 600 includes modifying a first parameter associated with a first edge router of the two or more edge routers if at least one trigger condition of the one or more trigger conditions is detected, the at least one trigger condition related to at least one transport link between the first edge router and the one or more external networks. For example, as shown in FIG. 5B, a trigger condition related to the transport link 570A (e.g., a trigger condition pertaining to one of the control connections, OMP connections, BFD links, or transport interfaces) may be met. Upon detecting that the trigger condition is met, the first VRRP priority of the first edge network device 542A which connects to the transport link 570A is reduced (e.g., from "100" to "50", as discussed with reference to FIG. 5B).

At block 606, the process 600 includes comparing the first parameter with a second parameter associated with a second edge router of the two or more edge routers. For example, the first VRRP priority of the first edge network device 542A can be compared with the second VRRP priority of the second edge network device 542B (which may remain at a value of "90" as shown in FIGS. 5A-B).

At block 608, the process 600 includes dynamically assigning a role of primary edge router to one of the first edge router or the second router based on comparing the first parameter with the second parameter, wherein traffic between a local network and the one or more external networks is routed through the primary edge router. For example, the primary edge router role can be reassigned based on determining that the modified first VRRP priority of the edge network device 542A (e.g., modified from "100" to "50") is lower in comparison with the second VRRP priority of the edge network device 542B (e.g., "90" in this example). Upon being designated as the primary edge router in this manner, the edge network device 542B can assume the role of routing packets between the local network 504 and the one or more external networks such as the Internet 560 and the MPLS network 562 through the transport links 570C and 570D.

Figure 7:
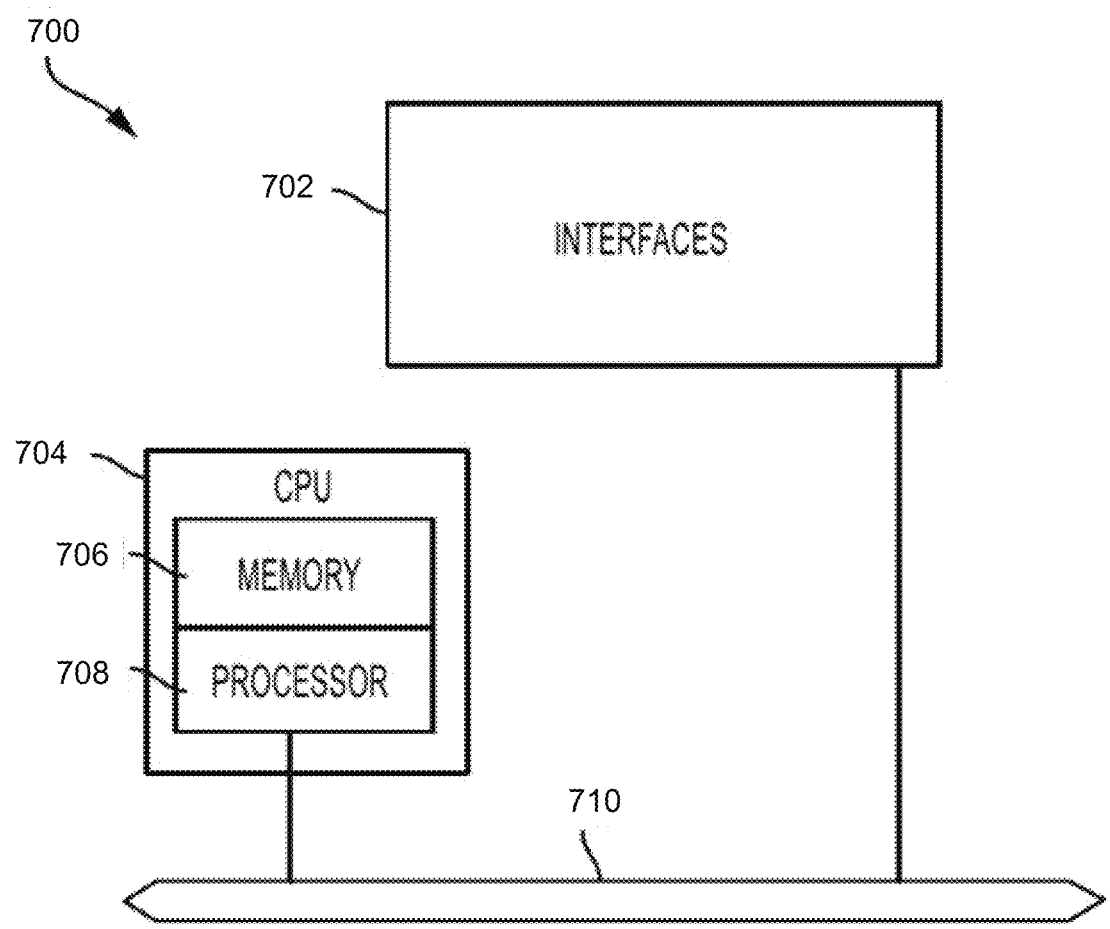
FIG. 7 illustrates an example network device in accordance with some examples.

FIG. 7 illustrates an example network device 700 suitable for implementing the aspects according to this disclosure. In some examples, the network 500 may be implemented according to the configuration of the network device 700. The network device 700 includes a central processing unit (CPU) 704, interfaces 702, and a connection 710 (e.g., a PCI bus). When acting under the control of appropriate software or firmware, the CPU 704 is responsible for executing packet management, error detection, and/or routing functions. The CPU 704 preferably accomplishes all these functions under the control of software including an operating system and any appropriate applications software. The CPU 704 may include one or more processors 708, such as a processor from the INTEL X86 family of microprocessors. In some cases, processor 708 can be specially designed hardware for controlling the operations of the network device 700. In some cases, a memory 606 (e.g., non-volatile RAM, ROM, etc.) also forms part of the CPU 704. However, there are many different ways in which memory could be coupled to the system.

The interfaces 702 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 704 to efficiently perform routing computations, network diagnostics, security functions, etc.

Although the system shown in FIG. 7 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 700.

Regardless of the network device's configuration, it may employ one or more memories or memory modules (including memory 706) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 706 could also hold various software containers and virtualized execution environments and data.

The network device 700 can also include an application-specific integrated circuit (ASIC), which can be configured to perform routing and/or switching operations. The ASIC can communicate with other components in the network device 700 via the connection 710, to exchange data and signals and coordinate various types of operations by the network device 700, such as routing, switching, and/or data storage operations, for example.

Figure 8:
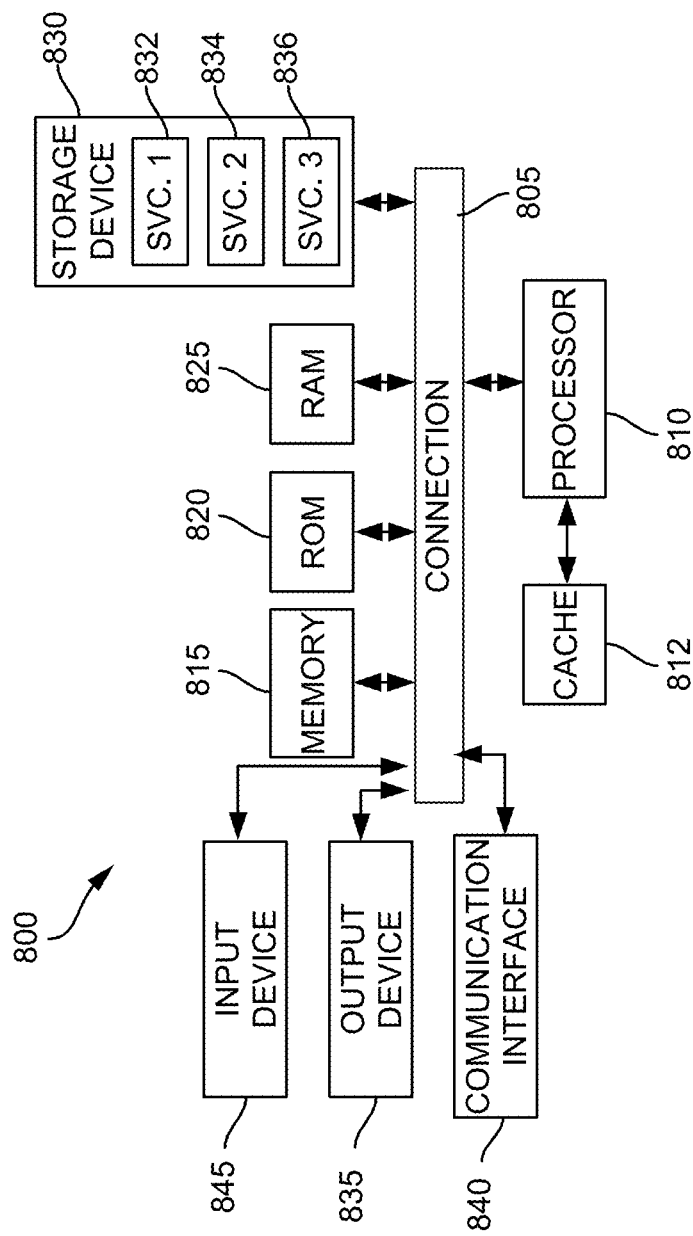
FIG. 8 illustrates an example computing device architecture, in accordance with some examples.

FIG. 8 illustrates an example computing device architecture 800 of an example computing device which can implement the various techniques described herein. The components of the computing device architecture 800 are shown in electrical communication with each other using a connection 805, such as a bus. The example computing device architecture 800 includes a processing unit (CPU or processor) 810 and a computing device connection 805 that couples various computing device components including the computing device memory 815, such as read only memory (ROM) 820 and random access memory (RAM) 825, to the processor 810.

The computing device architecture 800 can include a cache of high-speed memory connected directly with, in close proximity to, or integrated as part of the processor 810. The computing device architecture 800 can copy data from the memory 815 and/or the storage device 830 to the cache 812 for quick access by the processor 810. In this way, the cache can provide a performance boost that avoids processor 810 delays while waiting for data. These and other modules can control or be configured to control the processor 810 to perform various actions. Other computing device memory 815 may be available for use as well. The memory 815 can include multiple different types of memory with different performance characteristics. The processor 810 can include any general purpose processor and a hardware or software service, such as service 1 832, service 2 834, and service 3 836 stored in storage device 830, configured to control the processor 810 as well as a special-purpose processor where software instructions are incorporated into the processor design. The processor 810 may be a self-contained system, containing multiple cores or processors, a bus, memory controller, cache, etc. A multi-core processor may be symmetric or asymmetric.

To enable user interaction with the computing device architecture 800, an input device 845 can represent any number of input mechanisms, such as a microphone for speech, a touch-sensitive screen for gesture or graphical input, keyboard, mouse, motion input, speech and so forth. An output device 835 can also be one or more of a number of output mechanisms known to those of skill in the art, such as a display, projector, television, speaker device, etc. In some instances, multimodal computing devices can enable a user to provide multiple types of input to communicate with the computing device architecture 800. The communications interface 840 can generally govern and manage the user input and computing device output. There is no restriction on operating on any particular hardware arrangement and therefore the basic features here may easily be substituted for improved hardware or firmware arrangements as they are developed.

Storage device 830 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 825, read only memory (ROM) 820, and hybrids thereof. The storage device 830 can include services 832, 834, 836 for controlling the processor 810. Other hardware or software modules are contemplated. The storage device 830 can be connected to the computing device connection 805. In one aspect, a hardware module that performs a particular function can include the software component stored in a computer-readable medium in connection with the necessary hardware components, such as the processor 810, connection 805, output device 835, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
    monitoring a status of control connections transporting control plane data between two or more edge routers in a network and one or more network controllers in the network;
    detecting one or more trigger conditions based on a failure associated with a control connection between the one or more network controllers and a first edge router from the two or more edge routers, the failure indicating a connectivity issue associated with a transport link between the first edge router and the one or more external networks;
    in response to detecting the one or more trigger conditions, modifying a first parameter associated with the first edge router;
    comparing the first parameter with a second parameter associated with a second edge router of the two or more edge routers; and
    dynamically assigning a role of primary edge router to the second edge router based on comparing the first parameter with the second parameter, wherein traffic between the network and the one or more external networks is routed through the primary edge router.

2. The method of claim 1, wherein the first edge router and the second edge router are configured according to a Virtual Router Redundancy Protocol (VRRP), wherein the first parameter comprises a first VRRP priority and the second parameter comprises a second VRRP priority.

3. The method of claim 2, wherein modifying the first parameter comprises reducing the first VRRP priority to be lower than the second VRRP priority.

4. The method of claim 1, wherein the first edge router and the second edge router are configured according to a Border Gateway Protocol (BGP)/Open Shortest Path First (OSPF) protocol, wherein the first parameter comprises a first preference and the second parameter comprises a second preference.

5. The method of claim 4, wherein modifying the first parameter comprises reducing the first preference to be lower than the second preference.

6. The method of claim 1, wherein the one or more external networks comprise a wide area network, and wherein the connectivity issue corresponds to a connectivity problem with the transport link between the first edge router and the wide area network.

7. The method of claim 1, wherein of the control connections comprise a Overlay Management Protocol (OMP) connections to the one or more network controllers for a configurable time duration.

8. The method of claim 1, wherein the one or more trigger conditions further comprise:
- a status of configurable number of Bidirectional Forwarding Detections (BFDs) for the two or more edge routers.

9. The method of claim 1, wherein the one or more trigger conditions further comprise:
- a status of a configurable number of transport interfaces between the two or more edge routers and the one or more external networks.

10. A system, comprising:
one or more processors; and
a non-transitory computer-readable storage medium containing instructions which, when executed on the one or more processors, cause the one or more processors to perform operations including:
- monitoring a status of control connections carrying control plane data between two or more edge routers in a network and one or more network controllers in the network;
- detecting one or more trigger conditions based on a failure associated with a control connection between the one or more network controllers and a first edge router from the two or more edge routers, the failure indicating a connectivity issue associated with a transport link between the first edge router and the one or more external networks;
- in response to detecting the one or more trigger conditions, modifying a first parameter associated with the first edge router;
- comparing the first parameter with a second parameter associated with a second edge router of the two or more edge routers; and
- dynamically assigning a role of primary edge router to the second edge router based on comparing the first parameter with the second parameter, wherein traffic between the network and the one or more external networks is routed through the primary edge router.

11. The system of claim 10, wherein the first edge router and the second edge router are configured according to a Virtual Router Redundancy Protocol (VRRP), wherein the first parameter comprises a first VRRP priority and the second parameter comprises a second VRRP priority.

12. The system of claim 11, wherein modifying the first parameter comprises reducing the first VRRP priority to be lower than the second VRRP priority.

13. The system of claim 10, wherein the first edge router and the second edge router are configured according to a Border Gateway Protocol (BGP)/Open Shortest Path First (OSPF) protocol, wherein the first parameter comprises a first preference and the second parameter comprises a second preference.

14. The system of claim 13, wherein modifying the first parameter comprises reducing the first preference to be lower than the second preference.

15. The system of claim 10, wherein the one or more external networks comprise a wide area network, and wherein the connectivity issue corresponds to a connectivity problem with the transport link between the first edge router and the wide area network.

16. The system of claim 10, wherein the control connections comprise a Overlay Management Protocol (OMP) connections to the one or more network controllers for a configurable time duration.

17. The system of claim 10, wherein the one or more trigger conditions further comprise:
- a status of configurable number of Bidirectional Forwarding Detections (BFDs) for the two or more edge routers.

18. The system of claim 10, wherein the one or more trigger conditions further comprise:
- a status of a configurable number of transport interfaces between the two or more edge routers and the one or more external networks.

19. A non-transitory machine-readable storage medium, including instructions configured to cause a data processing apparatus to perform operations including:
- monitoring a status of control connections including control plane data between two or more edge routers in a network and one or more network controllers in the network;
- detecting one or more trigger conditions based on a failure associated with a control connection between the one or more network controllers and a first edge router from the two or more edge routers, the failure indicating a connectivity issue associated with a transport link between the first edge router and the one or more external networks;
- in response to detecting the one or more trigger conditions, modifying a first parameter associated with the first edge router;
- comparing the first parameter with a second parameter associated with a second edge router of the two or more edge routers; and
- dynamically assigning a role of primary edge router to the second edge router based on comparing the first parameter with the second parameter, wherein traffic between the network and the one or more external networks is routed through the primary edge router.

20. The non-transitory machine-readable storage medium of claim 19, wherein the first edge router and the second edge router are configured according to a Virtual Router Redundancy Protocol (VRRP), wherein the first parameter comprises a first VRRP priority and the second parameter comprises a second VRRP priority.

* * * * *